United States Patent
Teratani

[11] Patent Number: 5,968,427
[45] Date of Patent: Oct. 19, 1999

[54] FOAMED RUBBER COMPOSITIONS FOR PNEUMATIC TIRES AND METHOD OF PRODUCING THE SAME

[75] Inventor: Hiroyuki Teratani, Kodaira, Japan

[73] Assignee: Bridgestone Corporation, Tokyo, Japan

[21] Appl. No.: 09/066,891

[22] Filed: Apr. 28, 1998

Related U.S. Application Data

[62] Division of application No. 08/624,892, Mar. 27, 1996, Pat. No. 5,776,991.

[30] Foreign Application Priority Data

| Mar. 29, 1995 | [JP] | Japan | 7-71554 |
| Mar. 29, 1995 | [JP] | Japan | 7-71556 |
| Apr. 5, 1995 | [JP] | Japan | 7-80081 |

[51] Int. Cl.⁶ ........................................ C08J 9/04
[52] U.S. Cl. ................ 264/45.1; 264/45.3; 264/48; 521/99; 521/131; 521/142; 521/143; 521/146; 521/148; 521/150
[58] Field of Search ................. 264/45.1, 45.3, 264/48; 521/99, 131, 142, 143, 146, 148, 150

[56] References Cited

FOREIGN PATENT DOCUMENTS

| 0517538 | 6/1992 | European Pat. Off. |
| 0654383 | 10/1994 | European Pat. Off. |
| 46-31732 | 9/1971 | Japan |
| 51-147803 | 12/1976 | Japan |
| 55-135149 | 10/1980 | Japan |
| 56-52057 | 12/1981 | Japan |
| 58-199203 | 11/1983 | Japan |
| 60-137945 | 7/1985 | Japan |
| 63-89547 | 4/1988 | Japan |
| 4365607 | 12/1992 | Japan |
| 6-102737 | 12/1994 | Japan |
| 7315011 | 12/1995 | Japan |

*Primary Examiner*—John M. Cooney, Jr.
*Attorney, Agent, or Firm*—Sughrue, Mion, Zinn Macpeak & Seas, PLLC

[57] ABSTRACT

A foamed rubber composition for pneumatic tires comprises at least one diene polymer as a rubber ingredient and includes closed cells in a matrix rubber, each of these cells being covered with a coat layer made from a given amount of a resin or resin composite having a JIS-C hardness of not less than 75, a particle size of 10–200 μm and a reacted conjugate diene unit content of not less than 10% by weight. In the production of the foamed rubber composition, the melting point or glass transition point of the resin or resin composite is restricted to at least 5° C. lower than the vulcanizing temperature.

10 Claims, No Drawings

FOAMED RUBBER COMPOSITIONS FOR PNEUMATIC TIRES AND METHOD OF PRODUCING THE SAME

This is a divisional of application Ser. No. 08/624,892 filed Mar. 27, 1996 which is now U.S. Pat. No. 5,776,991.

BACKGROUND OF THE INVENTION

1. Field of the Invention

This invention relates to novel foamed rubber compositions for pneumatic tires and a method of producing the same, and more particularly to a foamed rubber composition suitable for use in a tread of a pneumatic tire, in which each of the resulting closed cells in a matrix rubber is covered with a coat layer, and a method of producing the same.

2. Description of Related Art

Recently, the demand for so-called all season tires capable of using without a tire exchange even in winter season likewise summer season is increasing. This type of the all season tire develops dry gripping property, wet gripping property, steering stability, durability and low fuel consumption even in winter season likewise summer season, and further has sufficient traction and braking performances on snow and/or ice roads.

As a tread rubber used in the all season tire, there have hitherto been known a method of decreasing a hardness at a low temperature in a tread rubber for summer season, a method of using a polymer having a low glass transition temperature or using a softening agent capable of adequately holding a modulus of elasticity of the tread rubber at a low temperature, and the like.

In the former method, however, the performances at snow and ice temperature range are almost developed owing to the hysteresis property of the polymer, but there are problems that the braking performance and steering stability on wet and dry roads are insufficient. On the other hand, the latter method is disclosed, for example, in JP-A-55-135149, JP-A-58-199203, JP-A-60-137945 and the like, but has a serious problem that it badly affects the wear resistance and durability in the running on general-purpose road though the performances on snow and/or ice roads are improved.

In any case, the tread rubbers produced by the above methods certainly exhibit good performances at a relatively low temperature range of not higher than −5° C. or at so-called dry-on-ice state, but do not provide sufficient friction coefficient at a wet state of about 0° C. or at so-called wet-on-ice state, so that it can not be said that the traction performance, braking performance and steering stability are sufficiently improved.

Lately, there are adopted some processes of applying means for the improvement of friction force to the tread rubber composition itself. As a first process, there is a process wherein the tread rubber is foamed by a proper means to form closed cells in the tread rubber composition (JP-A-63-89547). In general, a layer called as a false liquid layer is existent on a surface of an ice. When an object is forcedly moved on the ice surface, a part of the false liquid layer changes into a water film, which acts as a lubricant to develop a low friction constant. In the first process, the surface of the thus obtained tread rubber are covered with a great number of cells, so that the removal of water film created on a zone contacting with ice surface and the edge action of scraping the false liquid layer accompanied with a microscopic movement of the cell are developed to provide high friction properties on ice. The tires manufactured by using this process are commercially available as a studless tire. However, they have the effect of removing the false liquid layer from the ice surface, but can not directly scrape or break the ice itself different from the conventionally used spike tire, so that the improvement of the performances on ice is not yet satisfied.

As a second process, there is a process for attaining the high friction properties on ice by incorporating various high-hardness materials into the tread rubber to utilize the scratching effect of these materials on ice surface (JP-B-46-31732, JP-A-51-147803, JP-B-56-52057 and JP-B-6-102737). This process is apparent to be a process for providing the high friction properties of the tread rubber on ice by a mechanism different from the above first process. In fact, as the amount of the high-hardness material incorporated becomes larger, the tread rubber tends to provide the high friction properties on ice.

In the first process, the surface of the tread rubber is rendered into a rugged surface by foaming, so that ice surface is scratched by convex portions of the rugged surface and water existing on ice surface is absorbed and discharged by concave portions of the rugged surface. Moreover, the water absorbing and discharging effect is not required at a low temperature range hardly melting the ice surface (not higher than −3° C. in usual case), but the scratching effect can not be expected too much at such a low temperature range.

In the second process of incorporating the high-hardness material developing a high scratching effect into the matrix rubber of the tread, the effect of improving the performances on ice at about 0° C. having a large water content is small at this temperature. Further, the high-hardness material is existent as a foreign matter having no affinity with rubber, so that the wear resistance and fatigue properties are considerably degraded.

Under the above circumstances, the inventor has examined the incorporation of composite particle consisting of syn-1,2-polybutadiene resin, sulfur, vulcanization accelerator, carbon black and scorch retarder into a foamed tread rubber in order to simultaneously establish the improvement of performances on snow and/or ice road surfaces at wet state and the wear resistance and confirmed that the use of such a composite particle is not yet sufficient in a level required for commercial markets. That is, it is demanded to further improve the composite particle.

Moreover, the actual ice surface temperature variously changes over a time of from day to night, so that it is strongly desired to develop a tire tread indicating more stable performances on ice at a wider temperature range and causing no degradation of wear resistance and fatigue properties.

On the other hand, the conventional foamed rubber has a function of improving the friction coefficient on ice by the dewatering and water discharging effects of flowing out water film generated between a ground contact region of the tire and an ice road surface. However, such effects are critical in order to remove a greater amount of water film at the wet-on-ice state, so that it is difficult to improve the friction coefficient on ice at the wet-on-ice state.

Alternatively, the performances on ice are improved to a certain extent by incorporating particles having particular particle size and hardness as microspike for developing the scratching effect into the tread rubber, but the synergistic action between the scratching effect and the water discharging effect is less, so that the level of the performances on ice is still insufficient. That is, the feature that the synergistic action is small is due to the fact that the hardness of the particle is in inverse proportion to the adhesion property of the particle to rubber. In the conventional technique, as the particle becomes harder, the adhesion property of the particle to rubber lowers though the scratching effect is improved. As a result, the particles are apt to be fallen out from the ground contact region of the tread at a friction face between the tire and the road surface and hence the number of effective microspikes undesirably reduces and the scratching effect is not held long and also there are problems that the wear resistance and crack resistance are degraded. When the hard particles are added to a rubber composition containing a foaming agent, the foaming is caused at boundary surfaces of the particles to lower the adhesion force to matrix rubber.

SUMMARY OF THE INVENTION

It is, therefore, an object of the invention to provide a novel foamed rubber composition for pneumatic tires exhibiting a friction coefficient on ice at not only dry-on-ice state but also wet-on-ice state enough to develop a true synergistic action between the scratching effect and the water discharging effect at maximum as well as a method of producing the same.

According to a first aspect of the invention, there is the provision of a foamed rubber composition for pneumatic tires comprising at least one diene polymer selected from the group consisting of natural rubber, isoprene rubber, styrene-butadiene copolymer rubber, butadiene rubber and isobutyrene-isoprene copolymer rubber as a rubber ingredient and including closed cells in a matrix rubber, each of said cells being covered with a coat layer made from 2.5–20 parts by weight, based on 100 parts by weight of the rubber ingredient, of a resin or resin composite having a JIS-C hardness of not less than 75, a particle size of 10–200 μm and a reacted conjugate diene unit content of not less than 10% by weight.

According to a second aspect of the invention, there is the provision of a method of producing a foamed rubber composition for pneumatic tires, which comprises adding a resin or resin composite having a JIS-C hardness of not less than 75, a particle size of 10–200 μm, a melting point or glass transition point of 80–200° C. and a reacted conjugate diene unit content of not less than 10% by weight to at least one diene polymer selected from the group consisting of natural rubber, isoprene rubber, styrene-butadiene copolymer rubber, butadiene rubber and isobutyrene-isoprene copolymer rubber as a rubber ingredient together with at least a foaming agent and a vulcanizing agent and kneading them at a temperature lower than the above melting point or glass transition point while maintaining the above particle size; and vulcanizing the resulting kneaded mass at a temperature higher by at least 5° C. than the above melting point or glass transition point to cover each of the resulting closed cells with a coat layer made from the resin or resin composite.

According to a third aspect of the invention, there is the provision of a method of producing a foamed rubber composition for pneumatic tires, which comprises adding a resin or resin composite having a JIS-C hardness of not less than 75, a melting point or a glass transition point of 80–200° C. and a reacted conjugate diene unit content of not less than 10% by weight in form of block or pellet to at least one diene polymer selected from the group consisting of natural rubber, isoprene rubber, styrene-butadiene copolymer rubber, butadiene rubber and isobutyrene-isoprene copolymer rubber as a rubber ingredient and kneading them at a temperature lower than the above melting point or glass transition point until a particle size of the resin or resin composite is rendered into 10–200 μm; adding at least a foaming agent and a vulcanizing agent thereto and kneading them at a temperature lower than the above melting point or glass transition point while maintaining the above particle size; and vulcanizing the resulting kneaded mass at a temperature higher by at least 5° C. than the above melting point or glass transition point to cover each of the resulting closed cells with a coat layer made from the resin or resin composite.

In preferable embodiments of the invention, the resin or resin composite is made from at least one resin selected from the group consisting of crystalline syndiotactic-1,2-polybutadiene resin (hereinafter abbreviated as SPB resin simply) having a melting point of not lower than 80° C. and acrylonitrile-butadiene-styrene resin (hereinafter abbreviated as ABS resin simply) containing not less than 10% by weight of a reacted conjugate diene unit content and having a glass transition point (Tg) of not lower than 80° C., and the resin composite contains 0.3–5 parts by weight of sulfur and 0.1–7.0 parts by weight of a vulcanization accelerator based on 100 parts by weight of the resin and further includes carbon black satisfying a relation of $0<X+10Y<2000$ wherein X is a nitrogen adsorption specific area of carbon black (m$^2$/g) and Y is a compounding amount (parts by weight) of carbon black based on 100 parts by weight of the resin, and the closed cells are existent at a closed cell content of 5–35%.

DESCRIPTION OF THE PREFERRED EMBODIMENTS

According to the invention, the resin or resin composite having particular hardness, melting point or glass transition point and co-crosslinking property with the matrix rubber is kneaded at a particular kneading temperature with an unvulcanized rubber composition to maintain at a state of dispersing at a particular particle size just before vulcanization, which is then vulcanized at a particular vulcanizing temperature to form a foamed rubber composition containing closed cells therein, each of these cells being covered with a coat layer made from the resin or resin composite melted during the vulcanization. As a result, the foamed rubber composition according to the invention has an effect of largely improving the friction coefficient on an ice road surface of wet state.

As the rubber ingredient in the foamed rubber composition according to the invention, there is used at least one diene polymer usually used in a tread of a pneumatic tire, which includes natural rubber, isoprene rubber, styrene-butadiene copolymer rubber, butadiene rubber, isobutyrene-isoprene copolymer rubber and the like.

The reason why the JIS-C hardness is defined in the resin or resin composite according to the invention is due to the fact that the JIS-C hardness can not directly be measured in the coat layer made from the resin or resin composite because the closed cell covered with the coat layer is too small and the coat layer itself is considered to have the same JIS-C hardness as in the resin or resin composite. That is, the resin or resin composite is first melted during the vulcanization and the closed cells are drawn in a portion of the melted resin or resin composite, whereby the closed cell is encapsulated in a coat layer made from the melted resin or resin composite. When the JIS-C hardness is less than 75, the difference of hardness between the coat layer and ice (JIS-C hardness at 0° C.: 70) becomes less and hence the sufficient scratching effect by the coat layer can not be obtained.

In the resin or resin composite, the reason why the melting point or glass transition point of the resin is restricted to not lower than 80° C. is due to the fact that when the melting point or glass transition point is lower than 80° C., the resin or resin composite is easily melted and dispersed into rubber at usual kneading, warming-up and extrusion steps and hence it is very difficult to cover each of closed cells produced at the subsequent vulcanization step. Moreover, the melting point or glass transition point is preferable to be not higher than 200° C. because the vulcanization is generally carried out at a temperature of 100–200° C. If the melting point or glass transition point exceeds 200° C., the resin or resin composite can not be melted during the vulcanization and hence the closed cell can not be covered with the coat layer made from the resin or resin composite. Moreover, when the vulcanization temperature exceeds 200° C., the basic performances of the tire such as durability and the like are undesirably degraded, so that the vulcanization for the tire is carried out at a temperature of not higher than 200° C.

The reason why the particle size of the resin or resin composite is limited to a range of 10–200 μm is due to that fact that when the particle size is less than 10 μm, the coat layer is not satisfactorily formed and the closed cell can not be covered with the coat layer, while when it exceeds 200 μm, the closed cells are largely gathered in the coat layer created during the vulcanization to form a big closed cell having a fairly large diameter after the vulcanization, which serves as a breaking nucleus to degrade the wear resistance and resistance to cracking at groove bottom.

When the reacted conjugate diene unit content in the resin or resin composite is less than 10% by weight, the co-crosslinking property to the matrix rubber is too lacking and the adhesion of the coat layer to the matrix rubber is poor even if the closed cell can be covered with this coat layer. Therefore, if such a foamed rubber composition is applied to a tread of a pneumatic tire, the coat layer peels off from a worn surface of the tread during the running of the tire and hence the scratching effect of the coat layer is lost and the desired performances on ice can not be obtained.

In the resin composite, when the amount of sulfur is less than 0.3 part by weight based on 100 parts by weight of the resin, the adhesion force of the resulting coat layer to the matrix rubber after the vulcanization is poor, while when it exceeds 5.0 parts by weight, the operability in the production of the resin composite is considerably lowered. On the other hand, when the amount of the vulcanization accelerator is less than 0.1 part by weight, the adhesion force of the coat layer is poor, while when it exceeds 7.0 parts by weight, the operability is unfavorably lowered.

When a particular carbon black is compounded in the resin composite so as to satisfy the equation of $0<X+10Y<2000$ defined in the invention, the JIS-C hardness of the resin composite is increased to improve the scratching effect of the resulting coat layer on ice. However, when the value of the equation is not less than 2000, the kneading operation is difficult in the production of the resin composite. Moreover, the above equation is an empirical formula obtained by plotting experimental results on various properties and compounding amounts.

In the foamed rubber composition according to the invention, the reason why the closed cell content is limited to a range of 5–35% is due to the fact that when the closed cell content is less than 5%, the water discharging effect of the matrix rubber containing the closed cells becomes insufficient on ice road and also the scratching action of the coat layer on ice is not sufficient, while when it exceeds 35%, the durability and wear resistance of the matrix rubber are undesirably degraded. Particularly, the presence of such closed cells is indispensable to make large a microscopically water discharging effect at a state of existing a great amount of water on ice surface of about 0° C. to develop the excellent performances on snow and ice surfaces.

As a reinforcement for the foamed rubber composition, silica and/or carbon black may be compounded in a total amount of 10–100 parts by weight based on 100 parts by weight of the rubber ingredient. Furthermore, the foamed rubber composition may include additives usually used in the production of the tread rubber such as antioxidant, vulcanizing agent, vulcanization accelerator, accelerator activator and the like.

In the production of the foamed rubber composition according to the invention, the resin or resin composite satisfying the JIS-C hardness and melting point to glass transition point defined in the invention is first added to and kneaded with the rubber ingredient. In order to form the desired coat layer around the closed cell, it is necessary that the resin or resin composite is dispersed into the rubber ingredient at a particle size of 10–200 μm after the kneading and before the vulcanization. For this purpose, the particulate resin or resin composite having a particle size of 10–200 μm is directly added to the rubber ingredient, or the pellet or block of the resin or resin composite is added to the rubber ingredient and then finely divided into the desired particle size in the kneading. In the latter case, it is required to severely control the kneading conditions for avoiding the excessive kneading.

In order to maintain the particle size at the above range before the vulcanization and avoid the further decrease of the particle size through the kneading, the temperature at the kneading step is limited to lower than the melting point or glass transition point of the resin. Then, the kneaded mass is vulcanized at a temperature higher by at least 5° C. than the melting point or glass transition point of the resin, whereby the resin or resin composite is melted at a boundary to the matrix rubber and the closed cell is covered with the coat layer made from the molten resin or resin composite after the vulcanization. If the difference between the vulcanizing temperature and the melting point or glass transition point is lower than 5° C., the melting of the resin becomes insufficient during the vulcanization and the covering of the closed cell with the coat layer is ununiform.

As a foaming agent for the formation of the closed cell in the foamed rubber composition according to the invention, use may be made of azodicarbonamide, di-nitrosopentamethylene tetramine, azobisisobutyronitrile, and aromatic sulfonylhydrazides such as benzene sulfonylhydrazide, toluene sulfonylhydrazide, oxybisbenzene sulfonylhydrazide and the like.

When the foamed rubber composition according to the invention is applied to a tread of a pneumatic tire, the friction coefficient on ice is enhanced at not only dry-on-ice and wet-on-ice states and there can be obtained not only the same drainage effect as in the conventional foamed rubber but also the scratching effect by the coat layer covering the closed cell, so that there can be provided pneumatic tires having excellent performances on ice and wear resistance. Furthermore, the closed cell is covered with the coat layer strongly adhered to the matrix rubber, so that the formation and growth of microscopic cracks from the closed cell can be suppressed to improve the wear resistance and durability.

The foamed rubber composition according to the invention is applied to a tread in pneumatic tires, particularly pneumatic radial tires for passenger cars, truck and bus and heavy duty vehicles used on snow and ice road surfaces, whereby the excellent running performances on snow and ice roads are stably obtained over a wider temperature range. Further, the foamed rubber composition may be applied to other rubber articles such as shoe sole, caterpillar and the like.

The following examples are given in illustration of the invention and are not intended as limitations thereof.

Examples 1–12, Comparative Examples 1–7

Various foamed rubber compositions are prepared through kneading and vulcanization according to a compounding recipe and conditions as shown in Table 1. Details of a resin or a resin composite used in these examples are shown in Table 2. In Table 1, the kneading temperature at the compounding of the resin or resin composite means a temperature when the resin or resin composite is added to the unvulcanized rubber composition and dispersed thereinto through kneading, and the the working temperature after the kneading means a temperature when the foaming agent, vulcanizing agent and the like are dispersed into the kneaded mass containing the resin or resin composite through kneading and warming-up, and the resin particle size before vulcanization means a particle size of the resin or resin composite just before the vulcanization. Further, a test tire having a tire size of 165SR13 is manufactured by using this foamed rubber composition in a tire tread.

The properties of the foamed rubber composition and the tire in Table 1 are measured by the following methods, respectively.

Closed cell content:

The closed cell content is represented by the following equation (1):

$$V_s = \{(\rho_0 - \rho_g)/(\rho_1 - \rho_g) - 1\} \times 100 \ (\%) \ \ldots (1)$$

wherein $\rho_1$ is a density of foamed rubber (g/cm$^3$), $\rho_0$ is a density of solid phase portion in the foamed rubber (g/cm$^3$), and $\rho_g$ is a density of gas portion in the foamed rubber (g/cm$^3$). The foamed rubber is composed of the solid phase portion and the gas portion formed in the solid phase portion as a cavity (closed cell). Therefore, the density $\rho_g$ of the gas portion is very small and is approximately near to zero, so that the equation (1) is approximated to the following equation (2):

$$V_S = \{(\rho_0/\rho_1) - 1\} \times 100 \ (\%) \ \ldots (2)$$

Closed cell size and particle size of resin or resin composite before vulcanization:

The mean closed cell size or the particle size of the resin or resin composite before vulcanization is measured by cutting out a block specimen from a sample rubber composition and photographing a surface of the specimen by means of an optical microscope of 100–400 magnifications to measure sizes of 200 or more closed cells or 200 or more resin particle sizes of the resin or resin composite and represented as an arithmetical mean value.

Percentage of closed cells covered:

The percentage of closed cells covered is calculated by observing the cut surface of the specimen by means of the optical microscope to count the number of closed cells covered to the total closed cell number per 1 mm$^2$ of the cut surface.

Friction coefficient on ice:

The test tire is trained straight forwards on an asphalt paved road over a distance of 200 km and then subjected to braking from a speed of 20 km/h at an ice temperature of −2° C. or −8° C. to measure a braking distance. The friction coefficient on ice is represented by a reverse index of the measured braking distance on the basis that Comparative Example 1 or 4 is 100. The larger the index value, the better the braking property on ice.

Wear resistance:

The test tire is actually run on a concrete road over a given distance and then the remaining groove depth is measured. The wear resistance is represented by an index on the basis that the measured groove depth in Comparative Example 1 or 4 is 100. The larger the index value, the better the wear resistance.

Appearance:

The test tire is actually run on a circuit course over a distance of 7000 km and thereafter the surface of the tread rubber is observed on the circumference of the tire. The cracking appearance is evaluated as ⊚: no crack, ◯: crack length of not more than 0.5 mm, Δ: crack length of more than 0.5 mm but not more than 1 mm, and X: crack length of more than 1 mm.

Dynamic modulus (E' at −20° C.):

The dynamic modulus at −20° C. is measured by attaching a sample of 20 mm in length, 4.7 mm in width and 2 mm in thickness to a viscoelasticity measuring device (L-IR model, made by Toyo Seiki Kabushiki Kaisha) and applying an initial tension of 1.7 kgf/cm$^2$, an amplitude strain of 1% and a frequency of 50 Hz thereto.

TABLE 1(a)

| | Example 1 | Example 2 | Example 3 | Example 4 | Comparative Example 1 | Example 5 | Example 6 | Comparative Example 2 | Comparative Example 3 |
|---|---|---|---|---|---|---|---|---|---|
| (part by weight) | | | | | | | | | |
| NR | 70 | 70 | 70 | 70 | 70 | 70 | 70 | 70 | 70 |
| BR | 30 | 30 | 30 | 30 | 30 | 30 | 30 | 30 | 30 |
| SBR | 0 | 0 | 0 | 0 | 0 | 0 | 0 | 0 | 0 |
| Carbon black N220 | 45 | 45 | 45 | 45 | 45 | 45 | 45 | 45 | 45 |
| Stearic acid | 2.0 | 2.0 | 2.0 | 2.0 | 2.0 | 2.0 | 2.0 | 2.0 | 2.0 |
| ZnO | 4.5 | 4.5 | 4.5 | 4.5 | 4.5 | 4.5 | 4.5 | 4.5 | 4.5 |
| Antioxidant | 1.0 | 1.0 | 1.0 | 1.0 | 1.0 | 1.0 | 1.0 | 1.0 | 1.0 |
| Accel DM*1 | 0.3 | 0.3 | 0.3 | 0.3 | 0.3 | 0.3 | 0.3 | 0.3 | 0.3 |
| Accel CZ*2 | 0.6 | 0.6 | 0.6 | 0.6 | 0.6 | 0.6 | 0.6 | 0.6 | 0.6 |
| Sulfur | 1.2 | 1.2 | 1.2 | 1.2 | 1.2 | 1.2 | 1.2 | 1.2 | 1.2 |
| ADCA*3/urea*4 | 4.8 | 4.8 | 4.8 | 4.8 | 5.3 | 4.4 | 7.2 | 3.8 | 4.8 |

TABLE 1(a)-continued

|  | Example 1 | Example 2 | Example 3 | Example 4 | Comparative Example 1 | Example 5 | Example 6 | Comparative Example 2 | Comparative Example 3 |
|---|---|---|---|---|---|---|---|---|---|
| Resin or resin composite |  |  |  |  |  |  |  |  |  |
| JIS-C hardness | 82 | 94 | 92 | 97 | — | 82 | 82 | 82 | 92 |
| kind | A | H | C | D | — | A | A | A | E |
| amount (part by weight) | 7.0 | 7.0 | 7.0 | 7.0 | — | 10.0 | 15.0 | 25.0 | 7.0 |
| Tg or mp.(° C.) | 140 | 143 | 110 | 140 | — | 140 | 140 | 140 | 115 |
| particle size (μm) | 40 | 40 | 40 | 40 | — | — | — | — | 40 |
| Kneading temperature at the compounding of resin or resin composite (° C.) | 100 | 100 | 100 | 100 | — | 100 | 100 | 100 | 100 |
| Working temperature after the kneading (° C.) | 100 | 100 | 100 | 100 | 100 | 100 | 100 | 100 | 100 |
| Resin particle size before vulcanization (μm) | 40 | 40 | 40 | 40 | — | 40 | 40 | 40 | 40 |
| Vulcanizing temperature(° C.) | 145 | 145 | 145 | 145 | 145 | 145 | 145 | 145 | 145 |
| Closed cell content (%) | 16 | 16 | 16 | 16 | 16 | 16 | 16 | 16 | 16 |
| Closed cell size (μm) | 65 | 65 | 65 | 65 | 65 | 65 | 65 | 65 | 65 |
| Percentage of closed cell covered (%) | 83 | 85 | 83 | 83 | 0 | 94 | 100 | 100 | 85 |
| Index of friction coefficient on ice (−2° C.)*5 | 130 | 138 | 132 | 141 | 100 | 134 | 137 | 132 | 105 |
| Index of friction coefficient on ice (−8° C.)*5 | 111 | 113 | 111 | 118 | 100 | 112 | 114 | 111 | 102 |
| Wear resistance (index) | 103 | 103 | 102 | 101 | 100 | 100 | 100 | 90 | 98 |
| Appearance | ◎ | ◎ | ◎ | ◎ | ○ | ○ | ○ | Δ | ○ |
| E' at −20° C. (× $10^6$ dyn/cm$^2$) | 145 | 145 | 145 | 145 | 140 | 145 | 145 | 155 | 145 |

TABLE 1(b)

|  | Example 7 | Example 8 | Example 9 | Example 10 | Comparative Example 4 | Comparative Example 5 | Comparative Example 6 | Example 11 | Example 12 | Comparative Example 7 |
|---|---|---|---|---|---|---|---|---|---|---|
| (part by weight) |  |  |  |  |  |  |  |  |  |  |
| NR | 50 | 50 | 50 | 50 | 50 | 50 | 50 | 50 | 50 | 50 |
| BR | 30 | 30 | 30 | 30 | 30 | 30 | 30 | 30 | 30 | 30 |
| SBR | 20 | 20 | 20 | 20 | 20 | 20 | 20 | 20 | 20 | 20 |
| Carbon black N220 | 50 | 50 | 50 | 50 | 50 | 50 | 50 | 50 | 50 | 50 |
| Stearic acid | 3.0 | 3.0 | 3.0 | 3.0 | 3.0 | 3.0 | 3.0 | 3.0 | 3.0 | 3.0 |
| ZnO | 4.0 | 4.0 | 4.0 | 4.0 | 4.0 | 4.0 | 4.0 | 4.0 | 4.0 | 4.0 |
| Antioxidant | 1.0 | 1.0 | 1.0 | 1.0 | 1.0 | 1.0 | 1.0 | 1.0 | 1.0 | 1.0 |
| Accel DM*1 | 0.2 | 0.2 | 0.2 | 0.2 | 0.2 | 0.2 | 0.2 | 0.2 | 0.2 | 0.2 |
| Accel CZ*2 | 0.5 | 0.5 | 0.5 | 0.5 | 0.5 | 0.5 | 0.5 | 0.5 | 0.5 | 0.5 |
| Sulfur | 1.2 | 1.2 | 1.2 | 1.2 | 1.2 | 1.2 | 1.2 | 1.2 | 1.2 | 1.2 |
| ADCA*3/urea*4 | 5.0 | 5.0 | 5.0 | 5.0 | 5.2 | 4.5 | 5.0 | 5.0 | 4.4 | 4.5 |
| Resin or resin composite |  |  |  |  |  |  |  |  |  |  |
| JIS-C hardness | 82 | 94 | 92 | 97 | — | 74 | 94 | 94 | 94 | 94 |
| kind | A | B | C | D | — | F | G | H | I | J |
| amount (part by weight) | 7.5 | 7.5 | 7.5 | 7.5 | — | 7.5 | 7.5 | 7.5 | 7.5 | 7.5 |
| Tg or mp.(° C.) | 140 | 143 | 110 | 140 | — | 110 | 143 | 143 | 143 | 143 |
| particle size (μm) | 40 | 40 | 40 | 40 | — | 40 | 5.0 | 10.0 | 200 | 240 |
| Kneading temperature at the compounding of resin or resin composite (° C.) | 100 | 100 | 100 | 100 | — | 100 | 100 | 100 | 100 | 100 |
| Working temperature after the kneading (° C.) | 100 | 100 | 100 | 100 | 100 | 100 | 100 | 100 | 100 | 100 |
| Resin particle size before vulcanization (μm) | 40 | 40 | 40 | 40 | — | 40 | 5.0 | 10.0 | 200 | 240 |
| Vulcanizing temperature(° C.) | 155 | 155 | 155 | 155 | 155 | 155 | 155 | 155 | 155 | 155 |
| Closed cell content (%) | 22 | 22 | 22 | 22 | 22 | 22 | 22 | 22 | 22 | 22 |
| Closed cell size (μm) | 75 | 75 | 75 | 75 | 75 | 75 | 75 | 75 | 380 | 720 |
| Percentage of closed cell covered (%) | 81 | 81 | 81 | 81 | 0 | 81 | 18 | 74 | 80 | 80 |
| Index of friction coefficient on ice (−2° C.)*5 | 124 | 131 | 128 | 137 | 100 | 100 | 100 | 118 | 146 | 146 |
| Index of friction coefficient on ice (−8° C.)*5 | 109 | 111 | 110 | 113 | 100 | 100 | 100 | 106 | 126 | 124 |
| Wear resistance (index) | 103 | 102 | 104 | 102 | 100 | 100 | 96 | 100 | 100 | 86 |

TABLE 1(b)-continued

| | Example 7 | Example 8 | Example 9 | Example 10 | Comparative Example 4 | Comparative Example 5 | Comparative Example 6 | Example 11 | Example 12 | Comparative Example 7 |
|---|---|---|---|---|---|---|---|---|---|---|
| Appearance | ◎ | ◎ | ◎ | ◎ | ○ | ○ | Δ | ○ | ○ | X |
| E' at −20° C. (× 10⁶ dyn/cm²) | 165 | 165 | 165 | 165 | 160 | 165 | 165 | 165 | 165 | 165 |

*1: dibenzothiazyl disulfide (vulcanization accelerator)
*2: N-cyclohexyl-2-benzothiazyl sulfonamide (vulcanization accelerator)
*3: dinitrosopentamethylene tetraamine
*4; mixing ratio of DPT/urea = 1:1 (weight ratio)
*5: dry-on-ice state at −8° C., wet-on-ice state at −2° C.

TABLE 2

| Kind of resin or resin composite | Resin | Tg or mp. (° C.) | Carbon black | | | Sulfur | Accel NS *6 | Scorch reterdar *7 | Particle size (μm) | Reacted conjugate diene unit content (wt %) | JIS-C hardness |
|---|---|---|---|---|---|---|---|---|---|---|---|
| | | | X | Y | X + 10Y | | | | | | |
| A | SPB | 140 | — | — | — | — | — | — | 40 | 100 | 82 |
| B | ABS | 143 | — | — | — | — | — | — | 40 | 12 | 94 |
| C | RB | 110 | 83 | 100 | 1083 | 0.5 | 0.5 | 0.5 | 40 | 50 | 92 |
| D | SPB | 140 | 83 | 50 | 583 | 0.5 | 0.5 | 0.5 | 40 | 66 | 97 |
| E | AS | 115 | — | — | — | — | — | — | 40 | 0 | 92 |
| F | RB | 110 | 83 | 25 | 283 | 0.5 | 0.5 | 0.5 | 40 | 79 | 74 |
| G | ABS | 143 | — | — | — | — | — | — | 5.0 | 12 | 94 |
| H | ABS | 143 | — | — | — | — | — | — | 10 | 12 | 94 |
| I | ABS | 143 | — | — | — | — | — | — | 200 | 12 | 94 |
| J | ABS | 143 | — | — | — | — | — | — | 240 | 12 | 94 |

*6: N-oxydiethylene-2-benzothiazolylsulfenamide
*7: Santoguard PV125, trade name made by Nippon Monsanto Company Limited Comparative Examples 1 and 4 are so-called conventional foamed rubber containing closed cells not covered with the coat layer, so that they are low in the friction coefficient on ice as compared with those of the examples according to the invention. On the contrary, the friction coefficient on ice is largely improved in all examples containing closed cells covered with the coat layer.

In Comparative Example 2, the closed cell is covered with the coat layer, but the amount of the resin is too large, so that the wear resistance is degraded. This shows that it is necessary to maintain the amount of the resin at a given range for improving the wear resistance.

In Comparative Example 3, the conjugate diene monomer is not used in the production of the resin, so that the crosslinking property to the matrix rubber and the wear resistance are poor. Further, the scratching effect is small and the improvement of performances on ice is slight.

In Comparative Example 5, the JIS-C hardness of the resin constituting the coat layer is outside the range defined in the invention, so that the scratching effect of the coat layer is not obtained and is substantially equal to that of the conventional foamed rubber. This shows that the coat layer is necessary to have a JIS-C hardness of a given value or more for obtaining the satisfactory scratching effect.

In Comparative Example 6, the particle size of the resin in the vulcanization is smaller than the range defined in the invention, so that a greater amount of closed cells are not covered with the coat layer and the satisfactory scratching effect is not obtained. In Comparative Example 7, the particle size of the resin in the vulcanization is larger than the range defined in the invention, so that the size of the closed cell covered becomes larger and hence the wear resistance is degraded. This shows that the particle size of the resin or resin composite in the foamed rubber is important to be maintained at a given range for effectively covering the closed cell.

Examples 13–22, Comparative Examples 8–15

Various foamed rubber compositions are prepared through kneading and vulcanization according to a compounding recipe and conditions as shown in Table 3 or 4. Details of a resin or a resin composite used in these examples are shown in Table 5. Further, a test tire having a tire size of 165SR13 is manufactured by using this foamed rubber composition in a tire tread.

Concretely, the foamed rubber composition is produced as follows:

The unvulcanized rubber composition is kneaded at two stages in which polymer, carbon black, stearic acid, ZnO, antioxidant and the like are kneaded in a first stage and sulfur, vulcanization accelerator, foaming agent and the like are kneaded with the resulting kneaded mass of the first stage in a second stage.

The kneading is carried out in an OOC Banbury mixer at a starting temperature of 70° C. and a revolution number of 80 rpm under a ram pressure of 5 kg/cm² till the kneading temperature reaches to a given value (kneading temperature at the compounding of resin or resin composite shown in Table 3).

The time of compounding the resin or resin composite at either of the first stage and the second stage is determined by the shape of the resin or resin composite (particle, pellet, block or the like).

In case of the pellet or block, the resin or resin composite is added at the first stage and kneaded at a temperature higher than the melting point or glass transition point of the resin or resin composite but lower than the vulcanizing temperature so as to disperse at a particulate state having a given particle size range.

When the resin or resin particle has previously a given particle size, it is only added at the second stage.

The properties of the foamed rubber and the tire shown in Tables 3 and 4 are measured by the same methods as in Example 1.

TABLE 3

|  | Example 13 | Comparative Example 8 | Comparative Example 9 | Comparative Example 10 | Comparative Example 11 | Example 14 | Comparative Example 12 | Comparative Example 13 | Comparative Example 14 | Example 15 | Example 16 |
|---|---|---|---|---|---|---|---|---|---|---|---|
| (part by weight) | | | | | | | | | | | |
| NR | 70 | 70 | 70 | 70 | 70 | 70 | 70 | 70 | 70 | 70 | 70 |
| BR | 30 | 30 | 30 | 30 | 30 | 30 | 30 | 30 | 30 | 30 | 30 |
| Carbon black N220 | 50 | 50 | 50 | 50 | 50 | 50 | 50 | 50 | 50 | 50 | 50 |
| Stearic acid | 1.5 | 1.5 | 1.5 | 1.5 | 1.5 | 1.5 | 1.5 | 1.5 | 1.5 | 1.5 | 1.5 |
| ZnO | 4.0 | 4.0 | 4.0 | 4.0 | 4.0 | 4.0 | 4.0 | 4.0 | 4.0 | 4.0 | 4.0 |
| Antioxidant | 1.0 | 1.0 | 1.0 | 1.0 | 1.0 | 1.0 | 1.0 | 1.0 | 1.0 | 1.0 | 1.0 |
| Accel DM*1 | 0.2 | 0.2 | 0.2 | 0.2 | 0.2 | 0.2 | 0.2 | 0.2 | 0.2 | 0.2 | 0.2 |
| Accel CZ*2 | 0.5 | 0.5 | 0.5 | 0.5 | 0.5 | 0.5 | 0.5 | 0.5 | 0.5 | 0.5 | 0.5 |
| Sulfur | 1.2 | 1.2 | 1.2 | 1.2 | 1.2 | 1.2 | 1.2 | 1.2 | 1.2 | 1.2 | 1.2 |
| ADCA*3/urea*4 | 5.2 | 3.8 | 5.2 | 5.2 | 5.4 | 5.2 | 5.2 | 5.2 | 5.2 | 4.8 | 4.2 |
| Resin or resin composite | | | | | | | | | | | |
| kind | A | A | A | A | — | B | B | B | B | A | A |
| amount (part by weight) | 7.5 | 7.5 | 7.5 | 7.5 | — | 7.5 | 7.5 | 7.5 | 7.5 | 7.5 | 7.5 |
| Tg or mp.(° C.) | 130 | 130 | 130 | 130 | — | 130 | 130 | 130 | 130 | 130 | 130 |
| shape or particle size (μm) | block | block | block | block | — | 40 | 40 | 40 | 40 | block | block |
| Kneading temperature at the compounding of resin or resin composite (° C.) | 140 | 130 | 140 | 140 | — | 100 | 130 | 100 | 100 | 135 | 133 |
| Working temperature after the kneading (° C.) | 120 | 120 | 135 | 120 | — | 120 | 120 | 135 | 120 | 120 | 120 |
| Resin particle size before vulcanizing (μm) | 35 | 220 | 4.5 | 35 | — | 40 | 8.0 | 6.5 | 40 | 60 | 95 |
| Vulcanizing temperature(° C.) | 135 | 135 | 135 | 125 | 135 | 135 | 135 | 135 | 120 | 135 | 135 |
| Closed cell content (%) | 20 | 20 | 20 | 20 | 20 | 20 | 20 | 20 | 20 | 20 | 20 |
| Closed cell size (μm) | 70 | 1300 | 70 | 70 | 70 | 70 | 70 | 70 | 70 | 105 | 150 |
| Percentage of closed cell covered (%) | 80 | 80 | 14 | 0 | 0 | 80 | 16 | 14 | 0 | 85 | 98 |
| Index of friction coefficient on ice (−2° C.)*5 | 135 | 125 | 100 | 105 | 100 | 139 | 100 | 100 | 108 | 137 | 132 |
| Index of friction coefficient on ice (−8° C.)*5 | 118 | 108 | 100 | 100 | 100 | 119 | 100 | 100 | 100 | 114 | 113 |
| Wear resistance (index) | 105 | 50 | 100 | 90 | 100 | 102 | 100 | 100 | 86 | 103 | 102 |
| Appearance | ◉ | X | X | X | ○ | ◉ | X | X | X | ◉ | ○ |
| E' at −20° C. (× 10⁶ dyn/cm²) | 145 | 145 | 145 | 140 | 140 | 145 | 145 | 145 | 140 | 145 | 145 |

TABLE 4

|  | Example 17 | Example 18 | Example 19 | Example 20 | Comparative Example 15 | Example 21 | Example 22 |
|---|---|---|---|---|---|---|---|
| (part by weight) | | | | | | | |
| NR | 70 | 70 | 70 | 70 | 70 | 70 | 70 |
| BR | 30 | 30 | 30 | 30 | 30 | 30 | 30 |

TABLE 4-continued

|  | Example 17 | Example 18 | Example 19 | Example 20 | Comparative Example 15 | Example 21 | Example 22 |
|---|---|---|---|---|---|---|---|
| Carbon black N220 | 50 | 50 | 50 | 50 | 50 | 50 | 50 |
| Stearic acid | 1.5 | 1.5 | 1.5 | 1.5 | 1.5 | 1.5 | 1.5 |
| ZnO | 4.0 | 4.0 | 4.0 | 4.0 | 4.0 | 4.0 | 4.0 |
| Antioxidant | 1.0 | 1.0 | 1.0 | 1.0 | 1.0 | 1.0 | 1.0 |
| Accel DM*1 | 0.2 | 0.2 | 0.2 | 0.2 | 0.2 | 0.2 | 0.2 |
| Accel CZ*2 | 0.5 | 0.5 | 0.5 | 0.5 | 0.5 | 0.5 | 0.5 |
| Sulfur | 1.2 | 1.2 | 1.2 | 1.2 | 1.2 | 1.2 | 1.2 |
| ADCA*3/urea*4 | 5.0 | 4.4 | 3.8 | 4.0 | 5.2 | 5.2 | 4.2 |
| Resin or resin composite | | | | | | | |
| kind | C | C | C | D | E | F | G |
| amount (part by weight) | 2.5 | 7.5 | 15 | 7.5 | 7.5 | 7.5 | 7.5 |
| Tg or mp.(° C.) | 140 | 14a | 140 | 130 | 130 | 130 | 130 |
| particle size (μm) | 80 | 80 | 80 | 110 | 8.0 | 15 | 30 |
| Kneading temperature at the compounding of resin or resin composite (° C.) | 100 | 100 | 100 | 100 | 100 | 100 | 120 |
| Working temperature after the kneading (° C.) | 120 | 120 | 120 | 120 | 120 | 120 | 120 |
| Resin particle size before vulcanization (μm) | 80 | 80 | 80 | 110 | 8.0 | 15.0 | 30.0 |
| Vulcanizing temperature(° C.) | 145 | 145 | 145 | 135 | 135 | 135 | 135 |
| Closed cell content (%) | 20 | 20 | 20 | 20 | 20 | 20 | 20 |
| Closed cell size (μm) | 130 | 130 | 130 | 170 | 70 | 70 | 70 |
| Percentage of closed cell covered (%) | 22 | 80 | 98 | 80 | 14 | 24 | 82 |
| Index of friction coefficient on ice (−2° C.)*5 | 104 | 119 | 120 | 121 | 100 | 109 | 134 |
| Index of friction coefficient on ice (−8° C.)*5 | 100 | 107 | 110 | 110 | 100 | 103 | 114 |
| Wear resistance (index) | 100 | 100 | 100 | 100 | 100 | 100 | 104 |
| Appearance | ◯ | ◎ | ◯ | ◯ | X | ◎ | ◎ |
| E' at −20° C. (× 10⁶ dyn/cm²) | 140 | 140 | 150 | 145 | 145 | 145 | 145 |

TABLE 5

| Kind of resin or resin composite | Resin | Tg or mp. (° C.) | Carbon black X | Y | X + 10Y | Sulfur | Accel NS *6 | Scorch reterdar *7 | Shape or Particle size (μm) | Reacted conjugate diene unit content (wt %) | JIS-C hardness |
|---|---|---|---|---|---|---|---|---|---|---|---|
| A | SPB | 130 | 83 | 100 | 1083 | 0.5 | 0.5 | 0.5 | block | 50 | 96 |
| B | ABS | 130 | — | — | — | — | — | — | 40 | 14 | 94 |
| C | SPB | 130 | — | — | — | — | — | — | 80 | 100 | 84 |
| D | SPB | 130 | 83 | 50 | 583 | — | — | — | 110 | 67 | 89 |
| E | SPB | 130 | 83 | 50 | 583 | — | — | — | 8.0 | 67 | 89 |
| F | SPB | 130 | 83 | 50 | 583 | — | — | — | 15.0 | 67 | 89 |
| G | SPB | 130 | — | — | — | — | — | — | 30 | 100 | 89 |

In Comparative Example 8, the particle size of the resin composite before the vulcanization is larger than a given value defined in the invention, so that the size of closed cell is too large and the wear resistance and appearance are poor. On the other hand, the wear resistance and appearance are excellent in all examples because the particle size before the vulcanization is within a given range defined in the invention.

In Comparative Example 9, the working temperature after the kneading is higher than the melting point of the resin, so that the dispersion of the resin composite through melting is promoted and the particle size before the vulcanization is too small, and hence the number of closed cells covered with the coat layer becomes small and the scratching effect is not sufficiently obtained and the friction coefficient on ice is not improved. On the other hand, the friction coefficient on ice is improved in all examples because the coat layer is formed to an extent of sufficiently providing the scratching effect. As the percentage of closed cell covered becomes higher, the friction coefficient on ice becomes higher.

In Comparative Examples 10 and 14, the vulcanizing temperature is lower than the melting point of the resin, so that the resin composite can not be melted during the vulcanization for covering the closed cell and hence the wear resistance is degraded. This shows that the vulcanization temperature is important to be not lower than the melting point of the resin for covering the closed cell.

Comparative Example 11 is a foamed rubber containing no resin or resin composite prepared as a control for evaluation of friction coefficient on ice and wear resistance.

In Comparative Example 12, the resin having a given particle size is kneaded with the unvulcanized rubber composition at the melting point thereof, so that the particle size of the resin is rendered into a value smaller than the given value during the kneading and hence the amount of the coated closed cell is small and the friction coefficient on ice is not improved. This shows that it is important to maintain the particle size of the resin within a given range before the vulcanization.

In Comparative Example 13, the working temperature after the kneading exceeds the melting point of the resin, so that the melting and dispersion of the resin is too promoted and hence the formation of the coat layer is insufficient.

In Comparative Example 15, the particle size of the resin composite is less than a given value at the compounding stage before the vulcanization, so that the covering of the closed cell is insufficient and the satisfactory results are not obtained.

Examples 23–34, Comparative Examples 16–24

Various foamed rubber compositions are prepared through kneading and vulcanization according to a compounding recipe and conditions as shown in Table 6. Details of a resin or a resin composite used in these examples are shown in Table 7. Further, a test tire having a tire size of 165SR13 is manufactured by using this foamed rubber composition in a tire tread.

Since the particle size of the resin or resin composite used in these examples is within a range defined in the invention, the resin or resin composite is added at the second stage in the same two-stage kneading as in Example 13.

The properties of the foamed rubber and the tire shown in Table 6 are measured by the same methods as in Example 1.

TABLE 6(a)

|  | Example 23 | Example 24 | Example 25 | Example 26 | Comparative Example 17 | Example 27 | Example 28 | Example 29 | Comparative Example 18 | Comparative Example 19 | Example 30 |
|---|---|---|---|---|---|---|---|---|---|---|---|
| (part by weight) |  |  |  |  |  |  |  |  |  |  |  |
| NR | 60 | 60 | 60 | 60 | 60 | 60 | 60 | 60 | 60 | 60 | 60 |
| BR | 40 | 40 | 40 | 40 | 40 | 40 | 40 | 40 | 40 | 40 | 40 |
| Carbon black N220 | 50 | 50 | 50 | 50 | 50 | 50 | 50 | 50 | 50 | 54 | 53 |
| Stearic acid | 1.5 | 1.5 | 1.5 | 1.5 | 1.5 | 1.5 | 1.5 | 1.5 | 1.5 | 1.5 | 1.5 |
| ZnO | 3.0 | 3.0 | 3.0 | 3.0 | 3.0 | 3.0 | 3.0 | 3.0 | 3.0 | 3.0 | 3.0 |
| Antioxidant | 1.0 | 1.0 | 1.0 | 1.0 | 1.0 | 1.0 | 1.0 | 1.0 | 1.0 | 1.0 | 1.0 |
| Accel DM*1 | 0.2 | 0.2 | 0.2 | 0.2 | 0.2 | 0.2 | 0.2 | 0.2 | 0.2 | 0.2 | 0.2 |
| Accel CZ*2 | 0.5 | 0.5 | 0.5 | 0.5 | 0.5 | 0.5 | 0.5 | 0.5 | 0.5 | 0.5 | 0.5 |
| ADCA*3/urea*4 | 5.0 | 5.0 | 5.0 | 5.0 | 5.2 | 5.0 | 5.0 | 5.0 | 5.0 | 5.0 | 5.0 |
| Resin or resin composite |  |  |  |  |  |  |  |  |  |  |  |
| JIS-C hardness | 97 | 79 | 82 | 92 | — | 89 | 92 | 94 | 92 | 97 | 97 |
| kind | A | B | C | D | — | E | F | G | H | A | A |
| amount (part by weight) | 7.5 | 7.5 | 7.5 | 7.5 | — | 7.5 | 7.5 | 7.5 | 7.5 | 2 | 2.5 |
| Tg or mp.(° C.) | 140 | 140 | 140 | 140 | — | 102 | 119 | 143 | 115 | 140 | 140 |
| Kneading temperature at the compounding of resin or resin composite (° C.) | 95 | 95 | 95 | 95 | 95 | 95 | 95 | 95 | 95 | 95 | 95 |
| Working temperature after the kneading (° C.) | 95 | 95 | 95 | 95 | 95 | 95 | 95 | 95 | 95 | 95 | 95 |
| Vulcanizing temperature(° C.) | 150 | 150 | 150 | 150 | 150 | 150 | 150 | 150 | 150 | 150 | 150 |
| Closed cell content (%) | 20 | 20 | 20 | 20 | 20 | 20 | 20 | 20 | 20 | 20 | 20 |
| Closed cell size (μm) | 65 | 65 | 65 | 65 | 65 | 65 | 65 | 65 | 65 | 65 | 65 |
| Percentage of closed cell covered (%) | 80 | 80 | 80 | 80 | 80 | 80 | 80 | 80 | 80 | 10 | 22 |
| Index of friction coefficient on ice (−2° C.)*5 | 125 | 104 | 108 | 114 | 100 | 128 | 127 | 124 | 100 | 100 | 108 |
| Index of friction coefficient on ice (−8° C.)*5 | 112 | 102 | 105 | 108 | 100 | 113 | 113 | 112 | 100 | 100 | 103 |
| Wear resistance (index) | 102 | 101 | 101 | 102 | 100 | 102 | 100 | 100 | 100 | 100 | 100 |
| Appearance | ⊚ | ⊚ | ⊚ | ⊚ | ⊚ | ⊚ | ⊚ | ⊚ | ⊚ | ⊚ | ⊚ |
| E' at −20° C. (× $10^6$ dyn/cm$^2$) | 90 | 90 | 90 | 90 | 90 | 90 | 90 | 90 | 90 | 90 | 90 |

TABLE 6(b)

| | Example 31 | Comparative Example 20 | Comparative Example 16 | Example 32 | Comparative Example 21 | Comparative Example 22 | Example 33 | Comparative Example 23 | Example 34 | Comparative Example 24 |
|---|---|---|---|---|---|---|---|---|---|---|
| (part by weight) | | | | | | | | | | |
| NR | 60 | 60 | 60 | 60 | 60 | 60 | 60 | 60 | 60 | 60 |
| BR | 40 | 40 | 40 | 40 | 40 | 40 | 40 | 40 | 40 | 40 |
| Carbon black N220 | 46 | 42 | 50 | 50 | 50 | 55 | 50 | 55 | 52 | 55 |
| Stearic acid | 1.5 | 1.5 | 1.5 | 1.5 | 1.5 | 1.5 | 1.5 | 1.5 | 1.5 | 1.5 |
| ZnO | 3.0 | 3.0 | 3.0 | 3.0 | 3.0 | 3.0 | 3.0 | 3.0 | 3.0 | 3.0 |
| Antioxidant | 1.0 | 1.0 | 1.0 | 1.0 | 1.0 | 1.0 | 1.0 | 1.0 | 1.0 | 1.0 |
| Accel DM*1 | 0.2 | 0.2 | 0.2 | 0.2 | 0.2 | 0.2 | 0.2 | 0.2 | 0.2 | 0.2 |
| Accel CZ*2 | 0.5 | 0.5 | 0.5 | 0.5 | 0.5 | 0.5 | 0.5 | 0.5 | 0.5 | 0.5 |
| ADCA*3/urea*4 | 5.0 | 5.0 | 5.0 | 5.0 | 8.5 | 8.6 | 7.7 | 7.7 | 2.8 | 3.3 |
| Resin or resin composite | | | | | | | | | | |
| JIS-C hardness | 97 | 97 | 74 | 94 | 94 | — | 94 | — | 94 | — |
| kind | A | A | J | I | A | — | A | — | A | — |
| amount (part by weight) | 20 | 25 | 7.5 | 7.5 | 7.5 | — | 7.5 | — | 3 | — |
| Tg or mp.(° C.) | 140 | 140 | 110 | 110 | 140 | — | 140 | — | 140 | — |
| Kneading temperature at the compounding of resin or resin composite (° C.) | 95 | 95 | 95 | 95 | 95 | 95 | 95 | 95 | 95 | 95 |
| Working temperature after the kneading (° C.) | 95 | 95 | 95 | 95 | 95 | 95 | 95 | 95 | 95 | 95 |
| Vulcanizing temperature (° C.) | 150 | 150 | 150 | 150 | 150 | 150 | 150 | 150 | 150 | 150 |
| Closed cell content (%) | 20 | 20 | 20 | 20 | 40 | 40 | 35 | 35 | 5 | 5 |
| Closed cell size (μm) | 65 | 65 | 65 | 65 | 85 | 85 | 80 | 80 | 45 | 45 |
| Percentage of closed cell covered (%) | 100 | 100 | 80 | 80 | 65 | — | 72 | — | 100 | — |
| Index of friction coefficient on ice (−2° C.)*5 | 112 | 102 | 100 | 122 | 117 | 110 | 108 | 100 | 104 | 100 |
| Index of friction coefficient on ice (−8° C.)*5 | 107 | 100 | 100 | 110 | 106 | 100 | 105 | 100 | 102 | 100 |
| Wear resistance (index) | 100 | 97 | 101 | 101 | 91 | 81 | 102 | 100 | 102 | 100 |
| Appearance | ◎ | ○ | ◎ | ◎ | ○ | Δ | ◎ | ◎ | ◎ | ◎ |
| E' at −20° C. (× $10^6$ dyn/cm$^2$) | 90 | 90 | 90 | 90 | 65 | 65 | 72 | 72 | 125 | 125 |

TABLE 7

| Kind of resin or resin composite | Resin | Tg or mp. (° C.) | Carbon black | | | Sulfur | Accel NS *6 | Scorch reterdar *7 | Shape or Particle size (μm) | Reacted conjugate diene unit content (wt %) | JIS-C hardness |
|---|---|---|---|---|---|---|---|---|---|---|---|
| | | | X | Y | X + 10Y | | | | | | |
| A | SPB | 140 | 83 | 50 | 583 | 0.5 | 0.3 | 0.3 | 40 | 66 | 97 |
| B | SPB | 140 | — | — | — | — | — | — | 40 | 100 | 79 |
| C | SPB | 140 | — | — | — | 0.5 | 0.3 | 0.3 | 40 | 100 | 82 |
| D | SPB | 140 | 83 | 40 | 483 | 0.5 | 0.3 | 0.3 | 40 | 71 | 92 |
| E | ABS | 102 | — | — | — | — | — | — | 40 | 25 | 89 |
| F | ABS | 119 | — | — | — | — | — | — | 40 | 15 | 92 |
| G | ABS | 143 | — | — | — | — | — | — | 40 | 12 | 94 |
| H | ABS | 115 | — | — | — | — | — | — | 40 | 0 | 92 |
| I | SBP | 110 | 83 | 100 | 1083 | 0.5 | 0.3 | 0.3 | 40 | 50 | 94 |
| J | SPB | 110 | 83 | 25 | 283 | 0.5 | 0.3 | 0.3 | 40 | 79 | 74 |

As to the indexes of fiction coefficient on ice and wear resistance, Comparative Example 17 is control for Examples 23–32 and Comparative Examples 16–22, and Comparative Example 23 is control for Example 33, and Comparative Example 24 is control for Example 34, respectively.

As seen from Examples 23–26 and Comparative Example 17, the friction coefficient on ice is improved as the JIS-C hardness of the resin or resin composite becomes higher. As seen from Examples 27–29 and Comparative Example 18, the friction coefficient on ice and wear resistance are good as the reacted conjugate diene unit content becomes large.

As seen from Examples 27–28 and Comparative Examples 19–20, when the amount of the resin or resin composite compounded is small, the friction coefficient on ice is not improved, while when it is too large, the wear resistance lowers. From Example 32 and Comparative Example 16, it can be seen that the friction coefficient on ice is not improved when the JIS-C hardness of the resin composite is low.

From Comparative Examples 17, 21 and 22, it can be seen that when the closed cell content is too high, the friction coefficient on ice is improved but the wear resistance is degraded. When Example 33 is compared with Comparative Example 23, the effect of improving the friction coefficient on ice is observed at the same high closed cell content.

Further, when Example 34 is compared with Comparative Example 24, the effect of improving the friction coefficient on ice and wear resistance is observed at the same low closed cell content.

What is claimed is:

1. A method of producing a foamed rubber composition for pneumatic tires, which comprises adding a resin or resin composite having a JIS-C hardness of not less than 75, a particle size of 10–200 µm, a melting point or glass transition point of 80–200° C. and a reacted conjugate diene unit content of not less than 10% by weight to at least one diene polymer selected from the group consisting of natural rubber, isoprene rubber, styrene-butadiene copolymer rubber, butadiene rubber and isobutyrene-isoprene copolymer rubber as a rubber ingredient together with at least a foaming agent and a vulcanizing agent and kneading them at a temperature lower than the above melting point or glass transition point while maintaining the above particle size; and vulcanizing the resulting kneaded mass at a temperature higher by at least 5° C. than the above melting point or glass transition point to cover each of the resulting closed cells with a coat layer made from the resin or resin composite.

2. A method of producing a foamed rubber composition for pneumatic tires, which comprises adding a resin or resin composite having a JIS-C hardness of not less than 75, a melting point or a glass transition point of 80–200° C. and a reacted conjugate diene unit content of not less than 10% by weight in form of block or pellet to at least one diene polymer selected from the group consisting of natural rubber, isoprene rubber, styrene-butadiene copolymer rubber, butadiene rubber and isobutyrene-isoprene copolymer rubber as a rubber ingredient and kneading them at a temperature lower than the above melting point or glass transition point until a particle size of the resin or resin composite is rendered into 10–200 µm; adding at least a foaming agent and a vulcanizing agent thereto and kneading them at a temperature lower than the above melting point or glass transition point while maintaining the above particle size; and vulcanizing the resulting kneaded mass at a temperature higher by at least 5° C. than the above melting point or glass transition point to cover each of the resulting closed cells with a coat layer made from the resin or resin composite.

3. A method according to claim 1, wherein the resin or resin composite is made from at least one resin selected from the group consisting of crystalline syndiotactic-1,2-polybutadiene resin having a melting point of not lower than 80° C. and acrylonitrile-butadiene-styrene resin containing not less than 10% by weight of a reacted conjugate diene unit content and having a glass transition point (Tg) of not lower than 80° C.

4. A method according to claim 1, wherein the resin composite contains 0.3–5 parts by weight of sulfur and 0.1–7.0 parts by weight of a vulcanization accelerator based on 100 parts by weight of the resin.

5. A method according to claim 1, wherein the resin composite further includes carbon black satisfying a relation of 0<X+10Y<2000 wherein X is a nitrogen adsorption specific area of carbon black ($m^2/g$) and Y is a compounding amount (parts by weight) of carbon black based on 100 parts by weight of the resin.

6. A method according to claim 1, wherein the closed cells are existent at a closed cell content of 5–35%.

7. A method according to claim 2, wherein the resin or resin composite is made from at least one resin selected from the group consisting of crystalline syndiotactic-1,2-polybutadiene resin having a melting point of not lower than 80° C. and acrylonitrile-butadiene-styrene resin containing not less than 10% by weight of a reacted conjugate diene unit content and having a glass transition point (Tg) of not lower than 80° C.

8. A method according to claim 2, wherein the resin composite contains 0.3–5 parts by weight of sulfur and 0.1–7.0 parts by weight of a vulcanization accelerator based on 100 parts by weight of a vulcanization accelerator based on 100 parts by weight of the resin.

9. A method according to claim 2, wherein the resin composite further includes carbon black satisfying a relation of 0<X+10Y<2000 wherein X is a nitrogen adsorption specific area of carbon black ($m^2/g$) and Y is a compounding amount (parts by weight) of carbon black based on 100 parts by weight of the resin.

10. A method according to claim 2, wherein the closed cells are existent at a closed cell content of 5–35%.

* * * * *